US012766071B2

(12) United States Patent
Duan et al.

(10) Patent No.: US 12,766,071 B2
(45) Date of Patent: Oct. 20, 2026

(54) CONTROL METHOD AND SYSTEM OF VIBRATION CAPSULE

(71) Applicant: Ankon Medical Technologies (Shanghai) Co., LTD., Shanghai (CN)

(72) Inventors: Xiaodong Duan, Pleasanton, CA (US); Jianming Du, Shanghai (CN)

(73) Assignees: ANKON MEDICAL TECHNOLOGIES (SHANGHAI) CO., LTD., Shanghai (CN); ANX IP HOLDING PTE. LTD., Singapore (SG)

( * ) Notice: Subject to any disclaimer, the term of this patent is extended or adjusted under 35 U.S.C. 154(b) by 939 days.

(21) Appl. No.: 18/007,708

(22) PCT Filed: May 27, 2021

(86) PCT No.: PCT/CN2021/096441
§ 371 (c)(1),
(2) Date: Dec. 1, 2022

(87) PCT Pub. No.: WO2021/244395
PCT Pub. Date: Dec. 9, 2021

(65) Prior Publication Data
US 2023/0263702 A1 Aug. 24, 2023

(30) Foreign Application Priority Data
Jun. 1, 2020 (CN) ......................... 202010486778.3

(51) Int. Cl.
*A61H 23/02* (2006.01)
*A61H 21/00* (2006.01)

(52) U.S. Cl.
CPC ............. *A61H 21/00* (2013.01); *A61H 23/02* (2013.01); *A61H 2201/5084* (2013.01); *A61H 2201/5097* (2013.01)

(58) Field of Classification Search
CPC ................ A61B 1/00006; A61H 21/00; A61H 2201/5084; A61H 2201/5097
USPC ............................................................ 601/46
See application file for complete search history.

(56) References Cited

U.S. PATENT DOCUMENTS

2007/0003612 A1 1/2007 Williams
2017/0231470 A1* 8/2017 Yanagidate ........ A61B 1/00006 600/118
2017/0296428 A1* 10/2017 Duan ................ A61H 23/0263
2017/0340242 A1* 11/2017 Duan ................ A61B 1/00036
(Continued)

FOREIGN PATENT DOCUMENTS

CN 1878495 A 12/2006
CN 101543393 A 9/2009
CN 103190880 A 7/2013
(Continued)

*Primary Examiner* — Paige Kathleen Bugg
(74) *Attorney, Agent, or Firm* — Treasure IP Group, LLC

(57) ABSTRACT

The present invention provides a control method and system of a vibration capsule. The control method comprising: receiving a detection command of an acceleration sensor and controlling the acceleration sensor to work; obtaining a working acceleration data and transmitting the working acceleration data to an external device; and analyzing the working acceleration data and determining the position of the vibration capsule by the external device.

11 Claims, 2 Drawing Sheets

(56) References Cited

U.S. PATENT DOCUMENTS

| | | | | |
|---|---|---|---|---|
| 2018/0098689 | A1* | 4/2018 | On | A61B 1/00006 |
| 2023/0149256 | A1* | 5/2023 | Blackburn | A61H 23/0236 601/47 |

FOREIGN PATENT DOCUMENTS

| | | | |
|---|---|---|---|
| CN | 103249348 | A | 8/2013 |
| CN | 103281951 | A | 9/2013 |
| CN | 204293118 | U | 4/2015 |
| CN | 106922121 | A | 7/2017 |
| CN | 107847392 | A | 3/2018 |
| CN | 109219383 | A | 1/2019 |

* cited by examiner

CONTROL METHOD AND SYSTEM OF VIBRATION CAPSULE

CROSS-REFERENCE OF RELATED APPLICATIONS

The application is a National Phase Application of PCT International Application No. PCT/CN2021/096441, International Filing Date May 27, 2021, which claims priority from Chinese Patent Application No. 202010486778.3, filed Jun. 1, 2020, all of which are incorporated herein by reference in their entireties.

FIELD OF INVENTION

The present invention relates to a technique for a swallowable device, and more particularly to a control method and a control system of a vibration capsule.

BACKGROUND

Currently, capsule devices are widely used in medical practice. Among them, capsule endoscopy has achieved great results in the examination of patients in vivo and has shown obvious advantages over a traditional endoscope in the examination of small intestines of patients, which can detect intestinal regions and parts that cannot be detected by the traditional endoscope.

For another example, a vibration capsule acts on the colon wall of a human body through vibration, can effectively relieve colon spasm, promote colon movement, treat constipation and promote defecation, thereby achieving the effects of maintaining beauty, keeping young and preserving health. Moreover, the vibration capsule can promote the peristalsis of the small intestine and reduce the absorption of food by the small intestine, thus achieving the effect of losing weight.

However, the existing vibration capsule, working in a single way, can only work according to pre-set parameters, does not have human-machine interaction, not to mention the position of the vibration capsule, thus causing inconvenience to users.

Therefore, it is necessary to design a vibration capsule whose position can be known.

SUMMARY OF THE INVENTION

The present invention provides a control method of a vibration capsule, the control method comprises: receiving a detection command of an acceleration sensor of the vibration capsule and controlling the acceleration sensor to work; obtaining a working acceleration data of the vibration capsule; transmitting the working acceleration data to an external device; and analyzing the working acceleration data and determining the position of the vibration capsule by the external device.

Further, the step of "analyzing the working acceleration data by the external device" comprises: carrying out accumulated calculation on the working acceleration data every T time period by the external device; querying a preset acceleration data list of the vibration capsule, and comparing the working acceleration data after accumulated calculation with data of the preset acceleration data list.

Further, the step of "obtaining a working acceleration data of the vibration capsule" comprises: obtaining a working acceleration value detected by the acceleration sensor; calculating the working acceleration value and generating an acceleration data.

Further, the step of "transmitting the working acceleration data to an external device" comprises: transmitting the working acceleration data to a configurator; and controlling the configurator to transmit the working acceleration data to a vibration capsule control software.

Further, before the step of "receiving a detection command of an acceleration sensor" comprises: controlling a power supply of the vibration capsule to supply power to a working system of the vibration capsule; and presetting the working system.

Further, the step of "controlling a power supply of the vibration capsule to supply power to a working system of the vibration capsule" comprises: receiving a startup acceleration value detected by the acceleration sensor; determining whether the startup acceleration data reaches a preset value; and controlling the power supply to continuously supply power to the working system if the startup acceleration data reaches the preset value.

Further, the step of "presetting the working system" comprises: reading default parameters in an internal memory of the vibration capsule; and presetting the working system with the default parameters.

Further, after the step of "determining the position of the vibration capsule" comprises: receiving an acceleration value of the vibration capsule at its position transmitted by the external device, and taking the acceleration data as an acceleration threshold of the vibration capsule at the position; driving a motor of the working system to adjust its working state so that the current acceleration data detected by the acceleration sensor reaches the acceleration threshold of the position.

Further, after the step of "determining the position of the vibration capsule" comprises: communicating with the external device and transmitting matching information; determining whether a reply data information corresponding to the matching information is received; obtaining command information from the reply data information when the reply data information is received, and controlling the motor to work or updating default parameters in an internal memory of the vibration capsule according to the command information.

Further, the step of "communicating with the external device and transmitting matching information" comprises: transmitting the matching information to the external device once every N seconds, and transmitting the matching information every a times is a cycle. The matching information transmitted in each cycle comprises current vibration parameters and a working state of the motor.

Further, after the step of "determining the position of the vibration capsule" comprises: reading a default acceleration threshold in the internal memory; obtaining the working acceleration data; determining whether the working acceleration data is consistent with the default acceleration threshold; adjusting a working state of the motor when it is not consistent, so that the current acceleration data detected by the acceleration sensor reaches the default acceleration threshold.

The present invention further provides a control system of a vibration capsule, the control system is operated in a microcontroller unit of the vibration capsule, and the microcontroller unit executes instructions to: receive a detection command of an acceleration sensor and control the acceleration sensor to work; obtain a working acceleration data of the vibration capsule; transmit the working acceleration data to an external device; and analyze the working acceleration data and determine the position of the vibration capsule by the external device.

Further, before "receive a detection command from an accelerometer", the microcontroller unit executes instructions to: control a power supply of the vibration capsule to supply power to a working system of the vibration capsule; and preset the working system.

In the present invention, the acceleration sensor detects and obtains working acceleration data, the working acceleration data can be transmitted to an external device, and the external device can analyze the working acceleration data, so that the position of the vibration capsule can be determined. Therefore, the user can easily know the approximate position of the vibration capsule in an intestinal tract, and can better know the information such as running state, etc. Moreover, the user can perform further operations or judgments by the position of the vibration capsule.

DETAILED DESCRIPTION

In order to enable those in the art to better understand technical solutions in the present invention, the technical solutions in the embodiments of the present invention will be clearly and completely described below in conjunction with accompanying drawings in the embodiments of the present invention. It is clear that the embodiments described are only a part of the embodiments of the present invention, and the present invention is capable of other embodiments or of being practiced or carried out in various ways. Based on the embodiments in the present invention, all other embodiments obtained by a person of ordinary skill in the art without making creative labor shall fall within the scope of protection of the present invention.

Figure 1:
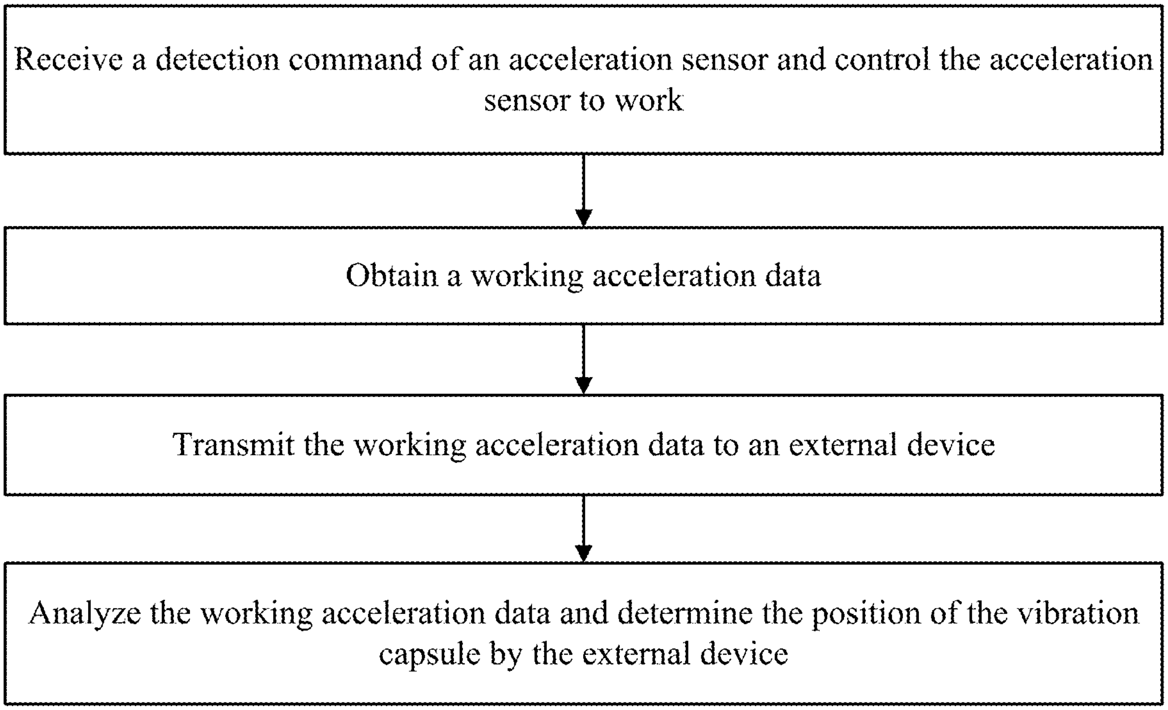
FIG. 1 illustrates a process flow diagram of a control method of a vibration capsule in accordance with aspects of the present invention.
Figure 2:
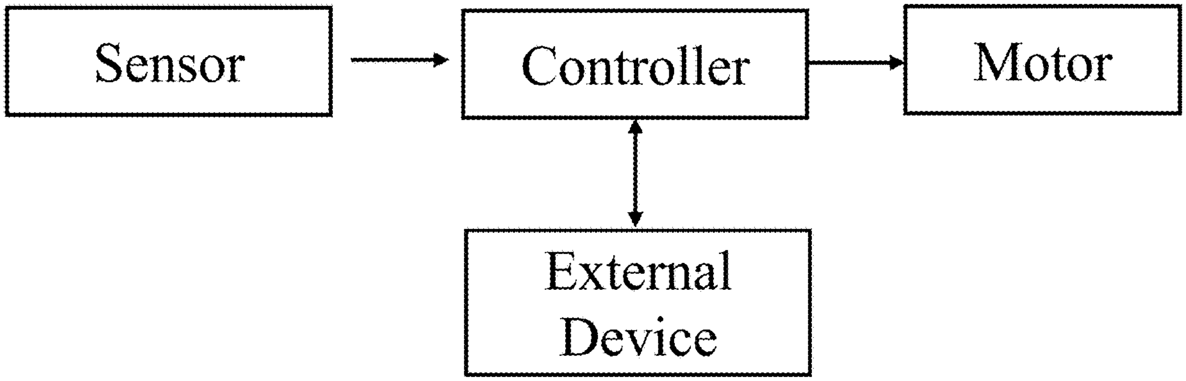
FIG. 2 is a schematic illustration of an embodiment of an electronic device of the present invention, showing the relationship between components.
Figure 3:
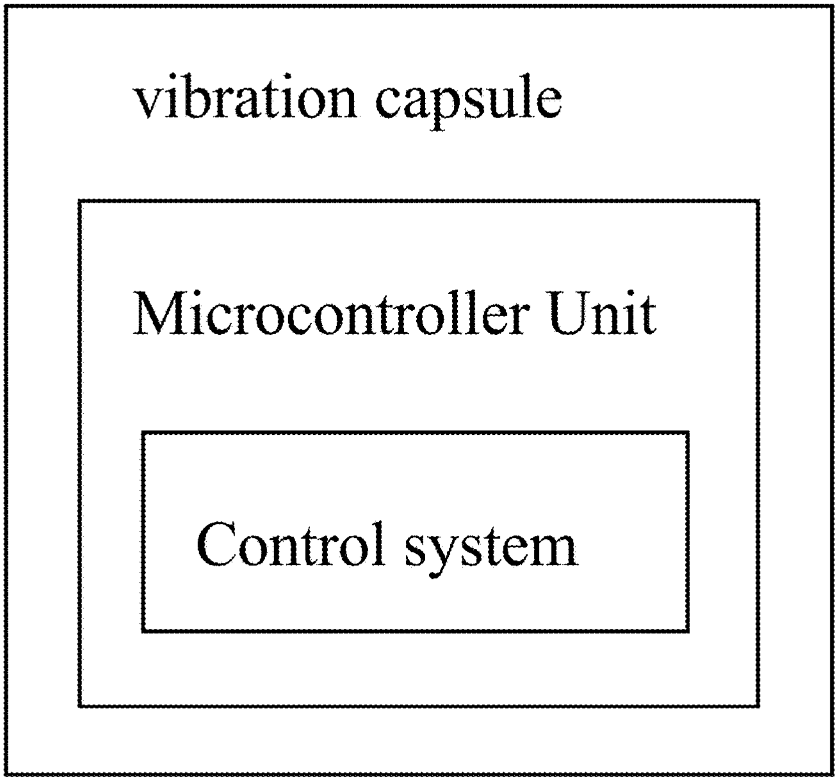
FIG. 3 is a schematic illustration of another embodiment of the electronic device of the present invention.

Referring to FIG. 1, a process flow diagram of a control method of a vibration capsule is illustrated in accordance with aspects of the present invention. The control method comprises:

- receiving a detection command of an acceleration sensor of the vibration capsule and controlling the acceleration sensor to work;
- obtaining a working acceleration data of the vibration capsule;
- transmitting the working acceleration data to an external device; and
- analyzing the working acceleration data and determining the position of the vibration capsule by the external device.

Therefore, the acceleration sensor detects and obtains the working acceleration data, the working acceleration data can be transmitted to the external device, and the external device can analyze the working acceleration data, so that the position of the vibration capsule can be determined. Therefore, a user can easily know the approximate position of the vibration capsule in an intestinal tract of a subject, and can better know information such as running state, etc. Moreover, the user can perform further operations or judgments by the position of the vibration capsule.

In order to determine the position of the vibration capsule, it is necessary to analyze the working acceleration data. Specifically, the step of "analyzing the working acceleration data by the external device" comprises:

- carrying out accumulated calculation on the working acceleration data every T time period by the external device;
- querying a preset acceleration data list of the vibration capsule, and comparing the working acceleration data after accumulated calculation with data of the preset acceleration data list.

The time period T can be one minute, and the preset acceleration data list displays positions in the intestinal tract and the working acceleration data after accumulated calculation corresponding to each position. Therefore, the approximate position of the vibration capsule in the intestinal tract can be determined through comparison. Certainly, the preset acceleration data list is obtained by means of measurement and calculation, etc., in advance, and has a good reference value.

In addition, the step of "obtaining a working acceleration data of the vibration capsule" comprises:

- obtaining a working acceleration value detected by an acceleration sensor; and
- calculating the working acceleration value and generating the working acceleration data.

Specifically, when a motor of the vibration capsule works, the motor vibrates and stops periodically, the acceleration sensor detects and obtains an acceleration value. Since the vibration capsule also moves along with the intestinal tract when the motor works, the position of the vibration capsule can be estimated accordingly. The working acceleration value detected by the acceleration sensor is three-axis acceleration data, and the three-axis acceleration data is numerically converted to obtain the working acceleration data.

The external device comprises a configurator and a vibration capsule control software, and further, the step of "transmitting the working acceleration data to an external device" comprises:

- transmitting the working acceleration data to the configurator; and
- controlling the configurator to transmit the working acceleration data to the vibration capsule control software.

The vibration capsule firstly transmits the working acceleration data to the configurator through a wireless signal, the configurator then transmits the working acceleration data to the vibration capsule control software, and the vibration capsule control software can carry out accumulated calculation on the working acceleration data and can display a determination result of the position of the vibration capsule on an interface of the vibration capsule control software. Therefore, the user can monitor working states of the vibration capsule through the vibration capsule control software, and can also change vibrating states of the vibration capsule.

After the acceleration sensor is turned on, the acceleration sensor is initialized first, and then performs high-speed sampling. In the process of high-speed sampling, the sampling speed of the acceleration sensor is about once every 50 milliseconds.

Therefore, before the step of "receiving a detection command of an acceleration sensor" comprises:

- controlling a power supply of the vibration capsule to supply power to a working system of the vibration capsule; and
- presetting the working system.

Before the acceleration sensor performs continuous high-speed detection, the working system is powered on first and then parameters of the working system are set. Specifically, the parameters of the motor such as vibration frequency, amplitude and duration can be set.

Specifically, the step of "controlling a power supply of the vibration capsule to supply power to a working system of the vibration capsule" comprises:

receiving a startup acceleration value detected by the acceleration sensor;

determining whether the startup acceleration data reaches a preset value or not; and controlling the power supply to continuously supply power to the working system when the startup acceleration data reaches the preset value.

The acceleration sensor is powered continuously, but is in a low-power timed slow detection state until the power supply is applied to the working system.

In the timed slow detection state, if the acceleration sensor detects the startup acceleration data and the startup acceleration data reaches the preset value, the vibration capsule is ready to be used, and the working system is powered on to start working, so that it can further communicate with the external device.

Moreover, in order to make the startup acceleration data reach the preset value, it is necessary to carry out specific operation on the vibration capsule.

For example, after the vibration capsule is taken out of a packaging box, a specific operation such as overturning, swinging, and shaking, etc., are performed on the vibration capsule within a specified time, so that the acceleration sensor can detect a relatively special startup acceleration data, and when the startup acceleration data reaches the preset value, the power supply is controlled to continuously supply power to the working system, so that the vibration capsule starts to work. Therefore, in the present invention, the working system of the vibration capsule is started by allowing a user to perform the specific operation on the vibration capsule, so that the user can independently select the starting working time of the vibration capsule, instead of having to swallow the vibration capsule once taken out of the packaging box as in the prior art. In turn, it allows the user to master the working state of the vibration capsule and adds interest to the use of the capsule.

The process of parameters configuration is further described as follows. The step of "presetting the working system" comprises:

reading the default parameters in an internal memory of the vibration capsule; and presetting the working system with the default parameters.

In the process of presetting, the default parameters are stored in the internal memory of the vibration capsule, and after the vibration capsule starts to work, the motor can work according to the default parameters. Specifically, a micro-controller unit inside the vibration capsule determines whether the capsule is powered on for the first time. If the capsule is powered on for the first time, the default parameters are read from a non-volatile memory inside the vibration capsule (for example: flash memory) to set the working system. If the capsule is not powered on for the first time, the default parameters are read from a random access memory (for example, Static Random-Access Memory, SRAM) inside the vibration capsule to set the working system.

Further, in a first embodiment, when the vibration capsule works in a human body, after the position of the vibration capsule in the human body is known, the working condition of the vibration capsule needs to be controlled. Specifically, after the step of "determining the position of the vibration capsule" comprises:

receiving an acceleration value of the vibration capsule at its position transmitted by the external device, and taking the acceleration data as an acceleration threshold of the vibration capsule at the position;

driving the motor in the working system to adjust its working state so that the current acceleration data detected by the acceleration sensor reaches the acceleration threshold of the position.

Therefore, the motor can work according to the current acceleration data, and communicate with the external device, which can be adjusted according to the position of the vibration capsule.

Moreover, the external device may also transmit other information to the vibration capsule to control the vibration capsule to work. Specifically, in a second embodiment, after the step of "determining the position of the vibration capsule" comprises:

communicating with the external device and transmitting matching information;

determining whether a reply data information corresponding to the matching information is received; and obtaining command information from the reply data information when the reply data information is received, and controlling the motor to work or updating default parameters in the internal memory according to the command information.

On the contrary, when no reply data information is received, the motor still works according to the original default parameters, and the corresponding default parameters is not modified.

Therefore, when the vibration capsule works, the communication with the external device is still maintained. If the reply data information is received, the vibration parameters of the motor can be adjusted according to the command information, so that the motor immediately vibrates according to the new vibration parameters. Alternatively, the default parameters may be updated so that the motor changes the vibration state in a subsequent operation. Therefore, the user can change the vibration parameters of the capsule through the external device as required, realize man-machine interaction, and control the capsule to vibrate with a better vibration force. In both the second embodiment and the first embodiment, the working state of the capsule can be adjusted by the vibration capsule control software.

In addition, the step of "communicating with the external device and transmitting matching information" comprises:

transmitting the matching information to the external device once every N seconds, and transmitting the matching information every a times is a cycle. The matching information transmitted in each cycle comprises the current vibration parameters and the working state of the motor. Specifically, N is 2 and a is 4, which is equivalent to that the working system transmits the matching information once every two seconds, and 4 times are a cycle. In a cycle, the matching information transmitted for the first three times is the current configuration parameters of the working system, and the matching information transmitted for the fourth time is the current state of the working system. In addition, each time the matching information is transmitted, it is switched to a receiving state. If the reply data is received within a certain time (for example, within 3 milliseconds), the reply data is extracted as the command information, and if the reply data is not received within the certain time (for example, within 3 milliseconds), it waits to transmits the matching information again. Therefore, after the transmitted matching information obtains the corresponding reply data information, the working system can be operated, the vibration parameters of the motor can be adjusted to make the motor have a new vibration state, or the default parameters can be updated.

In addition, in a third embodiment, after the step of "determining the position of the vibration capsule" comprises:

- reading a default acceleration threshold in the internal memory;
- obtaining the working acceleration data;
- determining whether the working acceleration data is consistent with a default acceleration threshold;
- when it is not consistent, adjusting the working state of the motor, so that the current acceleration data detected by the acceleration sensor reaches the default acceleration threshold.

In this embodiment, the motor of the vibration capsule can adjust its working state according to the default acceleration threshold stored in its own memory without having to communicate with the external device. In case of abnormal communication with the external device or other conditions, the default acceleration threshold stored in the capsule itself can still be used to adjust the working state of the motor.

The present invention further provides a control system of a vibration capsule, wherein the control system is operated in a microcontroller unit (MCU) of the vibration capsule. The microcontroller unit executes instructions to:

- receive a detection command of an acceleration sensor and control the acceleration sensor to work;
- obtain a working acceleration data of the vibration capsule; and
- transmit the working acceleration data to an external device;
- analyze the working acceleration data and determine the position of the vibration capsule by the external device.

Before the step of "receiving a detection command of an acceleration sensor", the microcontroller unit executes instructions to:

- control a power supply of the vibration capsule to supply power to a working system of the vibration capsule; and
- preset the working system.

Therefore, in summary, according to the present invention, the working acceleration value is continuously detected by the acceleration sensor, the working acceleration data is formed according to the working acceleration value, and the working acceleration data is analyzed by the external device, so that the position of the vibration capsule can be determined. Therefore, the user can easily know the approximate position of the vibration capsule in the intestinal tract, and can better know the information such as running state, etc. In addition, human-machine interaction can be realized, and a user can change the working state of the vibration capsule through the external device so as to meet the requirements of different users. In addition, a user can act on the vibration capsule through specific gestures such as overturning, swinging, and shaking, etc., so that the acceleration sensor can detect appropriate startup acceleration data in a specific time interval, and the user can independently select the starting time of the vibration capsule and master the working state of the capsule.

Furthermore, it should be understood that although the specification is described according to embodiments, not each embodiment contains only one separate technical solution, and that the specification is described in this manner only for clarity, and that those skilled in the art should consider the specification as a whole, and that the technical solutions in each embodiment may be suitably combined to form other embodiments as may be understood by those skilled in the art.

The series of detailed descriptions listed above are only specific to the feasible embodiments of the present invention and are not intended to limit the scope of protection of the present invention, and any equivalent embodiments or changes made without departing from the spirit of the art of the present invention shall be included in the scope of protection of the present invention.

The invention claimed is:

1. A control method of a vibration capsule, comprising:

a microcontroller unit, wherein the control method is operated in the microcontroller unit and the microcontroller unit is configured to execute the steps of:

- receiving a detection command of an acceleration sensor of the vibration capsule and controlling the acceleration sensor to work;
- obtaining a working acceleration data of the vibration capsule;
- transmitting the working acceleration data to an external device; and
- analyzing the working acceleration data and determining a position of the vibration capsule by the external device;
- communicating with the external device and transmitting matching information;
- determining whether a reply data information corresponding to the matching information is received;
- obtaining command information from the reply data information when the reply data information is received, and controlling a motor of the vibration capsule to work,
- receiving an acceleration value of the vibration capsule at its position transmitted by the external device, and taking the acceleration value as an acceleration threshold of the vibration capsule at the position;
- driving the motor of a working system to adjust its working state so that a current acceleration data detected by the acceleration sensor reaches the acceleration threshold of the position.

2. The control method of claim 1, wherein the step of analyzing the working acceleration data by the external device further comprises:

- carrying out accumulated calculation on the working acceleration data every T time period by the external device;
- querying a preset acceleration data list of the vibration capsule, and comparing the working acceleration data after accumulated calculation with data of the preset acceleration data list.

3. The control method of claim 1, wherein the step of obtaining a working acceleration data of the vibration capsule further comprises:

- obtaining a working acceleration value detected by the acceleration sensor, the working acceleration value comprising 3-axis acceleration data; and
- calculating and generating the working acceleration data by performing a numerical conversion on the working acceleration value.

4. The control method of claim 1, wherein the step of transmitting the working acceleration data to the external device comprises:

- transmitting the working acceleration data to a configurator; and controlling the configurator to transmit the working acceleration data to a vibration capsule control software.

5. The control method of claim 1, wherein before the step of receiving the detection command of the acceleration sensor, the control method further comprises:

controlling a power supply of the vibration capsule to supply power to the working system of the vibration capsule; and presetting the working system.

6. The control method of claim 5, wherein the step of controlling the power supply of the vibration capsule to supply power to the working system of the vibration capsule further comprises:

receiving a startup acceleration data detected by the acceleration sensor;

determining whether the startup acceleration data reaches a preset value; and controlling the power supply to continuously supply power to the working system when the startup acceleration data reaches the preset value.

7. The control method of claim 5, wherein the step of presetting the working system further comprises:

reading default parameters in the internal memory of the vibration capsule; and presetting the working system with the default parameters.

8. The control method of claim 1, wherein the step of communicating with the external device and transmitting matching information further comprises:

transmitting the matching information to the external device once every N seconds, and transmitting the matching information every time is a cycle;

wherein the matching information transmitted in each cycle comprises current vibration parameters and the working state of the motor.

9. The control method of claim 1, wherein after the step of determining the position of the vibration capsule, the control method further comprises:

reading a default acceleration threshold in the internal memory of the vibration capsule;

obtaining the working acceleration data;

determining whether the working acceleration data is consistent with the default acceleration threshold;

adjusting the working state of the motor of the vibration capsule when it is not consistent, so that the working acceleration data detected by the acceleration sensor reaches the default acceleration threshold.

10. A control system of a vibration capsule, comprising;

a microcontroller unit in the vibration capsule, wherein the control system is operated in the microcontroller unit and the microcontroller unit is configured to execute instructions to:

receive a detection command of an acceleration sensor and control the acceleration sensor to work;

obtain a working acceleration data of the vibration capsule;

transmit the working acceleration data to an external device; and analyze the working acceleration data and determine a position of the vibration capsule by the external device;

communicate with the external device and transmit matching information;

determine whether a reply data information corresponding to the matching information is received;

obtain command information from the reply data information when the reply data information is received, and control a motor of the vibration capsule to work, receiving an acceleration value of the vibration capsule at its position transmitted by the external device, and taking the acceleration value as an acceleration threshold of the vibration capsule at the position;

driving the motor of a working system to adjust its working state so that a current acceleration data detected by the acceleration sensor reaches the acceleration threshold of the position.

11. A control system of claim 10, wherein before the detection command is received from the acceleration sensor, the microcontroller is further configured to execute instructions to:

control a power supply of the vibration capsule to supply power to the working system of the vibration capsule; and preset the working system.

* * * * *